(12) United States Patent
Yamanaka et al.

(10) Patent No.: US 9,991,533 B2
(45) Date of Patent: Jun. 5, 2018

(54) FUEL CELL SYSTEM

(71) Applicant: TOYOTA JIDOSHA KABUSHIKI KAISHA, Toyota-shi, Aichi-ken (JP)

(72) Inventors: Tomio Yamanaka, Nagoya (JP); Masashi Toida, Nagoya (JP); Yoshiaki Naganuma, Toyota (JP); Mitsuhiro Nada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 97 days.

(21) Appl. No.: 15/183,367

(22) Filed: Jun. 15, 2016

(65) Prior Publication Data
US 2016/0380286 A1 Dec. 29, 2016

(30) Foreign Application Priority Data

Jun. 26, 2015 (JP) ................................. 2015-128908

(51) Int. Cl.
| | |
|---|---|
| H01M 8/04223 | (2016.01) |
| H01M 10/44 | (2006.01) |
| H01M 10/42 | (2006.01) |
| H01M 10/46 | (2006.01) |
| B60L 11/18 | (2006.01) |
| H01M 8/04225 | (2016.01) |
| H01M 16/00 | (2006.01) |
| H01M 8/04746 | (2016.01) |
| H01M 8/04664 | (2016.01) |
| H01M 8/04089 | (2016.01) |
| H01M 8/04828 | (2016.01) |

(52) U.S. Cl.
CPC ..... *H01M 8/04253* (2013.01); *B60L 11/1881* (2013.01); *H01M 8/04089* (2013.01); *H01M 8/04225* (2016.02); *H01M 8/04664* (2013.01); *H01M 8/04753* (2013.01); *H01M 16/006* (2013.01); *H01M 8/04947* (2013.01); *H01M 2250/20* (2013.01); *Y02T 90/32* (2013.01)

(58) Field of Classification Search
CPC ......... H01M 8/04253; H01M 8/04225; H01M 8/04664; B60L 11/1881
See application file for complete search history.

(56) References Cited

U.S. PATENT DOCUMENTS

| | | | |
|---|---|---|---|
| 7,434,565 B2 | 10/2008 | Miyachi | |
| 2004/0106026 A1 | 6/2004 | Fujita et al. | |
| 2010/0047663 A1* | 2/2010 | Manabe | H01M 8/04089 429/414 |

FOREIGN PATENT DOCUMENTS

| | | |
|---|---|---|
| JP | 2004-172025 | 6/2004 |
| JP | 2005-285686 | 10/2005 |
| JP | 2009-117169 A | 5/2009 |

* cited by examiner

*Primary Examiner* — Ladan Mohaddes
(74) *Attorney, Agent, or Firm* — Finnegan, Henderson, Farabow, Garrett & Dunner LLP

(57) ABSTRACT

A fuel cell system, comprising: a compressor that is placed in a supply flow path arranged to supply a cathode gas to a fuel cell; a first motor-operated valve that is placed between the fuel cell and the compressor in the supply flow path; a first stepping motor that is provided in the first motor-operated valve; a second motor-operated valve that is placed in a discharge flow path arranged to discharge the cathode gas from the fuel cell; a second stepping motor that is provided in the second motor-operated valve; and a controller that is configured to control power generation by the fuel cell and to input drive pulses into the first stepping motor and the second stepping motor, so as to open the first motor-operated valve and the second motor-operated valve at a start of the fuel cell and close the first motor-operated valve and the second motor-operated valve at a stop of the fuel cell, wherein the first stepping motor is driven by input of the drive pulse to generate a torque to open and close the first motor-operated valve, and the second stepping motor is driven by input of the drive pulse to generate a torque to open and close the second motor-operated valve, wherein the controller determines whether at least one of the first motor-operated valve and the second motor-operated valve is in a frozen state at the start of the fuel cell, when it is determined that neither the first motor-operated valve nor the second motor-operated valve is in the frozen state, the controller starts power generation by the fuel cell, and when it is determined that at least one of the first motor-operated valve and the second motor-operated valve is in the frozen state, the controller performs a predetermined process that repeats, a multiple number of times, alternately inputting a first drive pulse that generates a torque in a direction of increasing a valve opening and a second drive pulse that has a higher pulse speed than a pulse speed of the first drive pulse and generates a torque in a direction of decreasing the valve opening, to a stepping motor provided in at least the motor-operated valve in the frozen state out of the first stepping motor and the second stepping motor.

9 Claims, 11 Drawing Sheets

FUEL CELL SYSTEM

CROSS-REFERENCE TO RELATED APPLICATIONS

The present application claims priority from Japanese patent application P2015-128908 filed on Jun. 26, 2015, the content of which is hereby incorporated by reference into this application.

BACKGROUND

Field

The present invention relates to a fuel cell system.

Related Art

Various valves are used in a fuel cell system. Any of these valves may be frozen in a closed state during a stop of the fuel cell system. It is difficult to open the valve in the frozen state. This is likely to interfere with starting the fuel cell system. JP 2005-285686A discloses a technique of repeating opening and closing operations of a solenoid valve to eliminate the frozen state of the valve.

The target of this prior art technique is the solenoid valve that generates a relatively large force by the valve-opening and valve-closing operations. The valve-opening and valve-closing operations are thus expected to eliminate the frozen state to a certain degree. In the case of a motor-operated valve that is controlled to be opened and closed by a stepping motor, on the other hand, the simple valve-opening and valve-closing operations are unlikely to eliminate the frozen state. This is because the torque generated by the stepping motor is relatively small. By taking into account this problem, an object of the invention is thus to increase the likelihood that a motor-operated valve that is frozen in a closed state is opened by a stepping motor.

SUMMARY

In order to solve at least part of the problems described above, the invention may be implemented by aspects described below.

According to one aspect of the invention, there is provided a fuel cell system. The fuel cell system comprises a compressor that is placed in a supply flow path arranged to supply a cathode gas to a fuel cell; a first motor-operated valve that is placed between the fuel cell and the compressor in the supply flow path; a first stepping motor that is provided in the first motor-operated valve; a second motor-operated valve that is placed in a discharge flow path arranged to discharge the cathode gas from the fuel cell; a second stepping motor that is provided in the second motor-operated valve; and a controller that is configured to control power generation by the fuel cell and to input drive pulses into the first stepping motor and the second stepping motor, so as to open the first motor-operated valve and the second motor-operated valve at a start of the fuel cell and close the first motor-operated valve and the second motor-operated valve at a stop of the fuel cell. The first stepping motor is driven by input of the drive pulse to generate a torque to open and close the first motor-operated valve. The second stepping motor is driven by input of the drive pulse to generate a torque to open and close the second motor-operated valve. In the fuel cell system, the controller determines whether at least one of the first motor operated valve and the second motor-operated valve is in a frozen state at the start of the fuel cell. When it is determined that neither the first motor-operated valve nor the second motor-operated valve is in the frozen state, the controller starts power generation by the fuel cell. When it is determined, that at least one of the first motor-operated valve and the second motor-operated valve is in the frozen state, the controller performs a predetermined process that repeats, a multiple number of times, alternately inputting a first drive pulse that generates a torque in a direction of increasing a valve opening and a second drive pulse that has a higher pulse speed than a pulse speed of the first drive pulse and generates a torque in a direction of decreasing the valve opening, to a stepping motor provided in at least the motor-operated valve in the frozen state out of the first stepping motor and the second stepping motor.

The fuel cell system of this aspect causes the torque in the valve-opening direction and the torque in the valve-closing direction to be alternately applied to the motor-operated valve in the frozen state. The first drive pulse has the lower pulse speed than the second drive pulse, so that the torque in the direction of increasing the valve opening is larger than the torque in the direction of decreasing the valve opening, based on the characteristic of the stepping motor. This increases the likelihood that the frozen state is eliminated by the torque in the direction of increasing the valve opening. Additionally, inputting the second drive pulse into the stepping motor that is provided in the motor-operated valve in the frozen state generates the torque in the direction of decreasing the valve opening. The torque generated by the stepping motor is varied at the frequency that depends on the pulse speed of the drive pulse. Application of this vibration to the motor-operated valve in the frozen state is more likely to eliminate the frozen state. The second drive pulse has the higher pulse speed than the first drive pulse. This increases the frequency of the torque variation by the second drive pulse. This makes it more likely to eliminate the frozen state.

In the fuel cell system of the above aspect, when it is determined that at least one of the first motor-operated valve and the second motor-operated valve is in the frozen state, the controller may perform the predetermined process with respect to both the first stepping motor and the second stepping motor. This configuration does not require determination which of the motor-operated valves is in the frozen state.

In the fuel cell system of the above aspect, the first drive pulse may be a pulse that provides a larger valve opening than a valve opening corresponding to an effective sectional area of zero between a valve seat and a valve element in the first motor-operated valve or in the second motor-operated valve. In the fuel cell system of this aspect, inputting the first drive pulse into the stepping motor provided in the motor-operated valve in the frozen state increases the likelihood that the effective sectional area becomes larger than zero when the frozen state is eliminated.

In the fuel cell system of the above aspect, the second drive pulse may be a pulse that provides a smaller valve opening than a valve opening corresponding to an effective sectional area of zero between a valve seat and a valve element in the first motor-operated valve or in the second motor-operated valve. In the fuel cell system of this aspect, inputting the second drive pulse into the stepping motor provided in the motor-operated valve in the frozen state makes the valve element more likely to abut on the valve seat and thereby makes it more likely to eliminate the frozen state. The valve element is likely to abut on the valve seat in the motor-operated valve in the frozen state, when the motion of the valve element is limited in the frozen state but the valve element is slightly movable.

In the fuel cell system of the above aspect, the controller may drive the compressor to decrease a concentration of hydrogen in a gas discharged from the discharge flow path to or below a predetermined value. This configuration causes the cathode gas to be supplied to the fuel cell and dilutes an anode gas that is present at a cathode of the fuel cell immediately after elimination of the frozen state.

In the fuel cell system of the above aspect, the first motor-operated valve may comprise a mechanism configured as a flow dividing valve. The fuel cell system may further comprise a bypass that is arranged to connect the first motor-operated valve with the discharge flow path. The discharge flow path may be connected with the bypass at a position downstream of the second motor-operated valve. The fuel cell system may be stopped in a state that the first motor-operated valve makes the supply flow path communicate with the bypass. Even when the compressor is driven in the state that the first motor-operated valve is frozen, this configuration causes the compressed air to be discharged to the atmosphere and thereby prevents the pressure in the supply flow path from being excessively increased.

The fuel cell system of the above aspect may further comprise a secondary battery that is configured to accumulate electric power generated by the fuel cell and supply the accumulated electric power to the first motor-operated valve, the second motor-operated valve and the controller to perform the predetermined process. The controller may stop the predetermined process when a state of charge of the secondary battery becomes lower than a reference value. This configuration prevents the state of charge of the secondary battery from being excessively decreased.

In the fuel cell system of the above aspect, the controller may drive the compressor, input a drive pulse for opening the first motor-operated valve to the first stepping motor, and input a drive pulse for opening the second motor-operated valve to the second stepping motor at the start of fuel cell, in order to determine whether at least one of the first motor-operated valve and the second motor-operated valve is in the frozen state, based on whether power generation by the fuel cell is normally started or not. This configuration uses the configuration for power generation to determine whether the motor-operated valve is frozen.

In the fuel cell system of the above aspect, the first drive pulse input into the first stepping motor and the first drive pulse input into the second stepping motor may have different pulse speeds, and the second drive pulse input into the first, stepping motor and the second drive pulse input into the second stepping motor may have different pulse speeds. This configuration respectively provides adequate drive pulses for the first motor-operated valve and the second motor-operated valve.

The invention may be implemented by any of various aspects other than those described above, for example, a frozen state elimination method, a computer program that, is configured to implement this method, and a non-transitory storage medium in which the computer program is stored.

DESCRIPTION OF EMBODIMENTS

Figure 1:
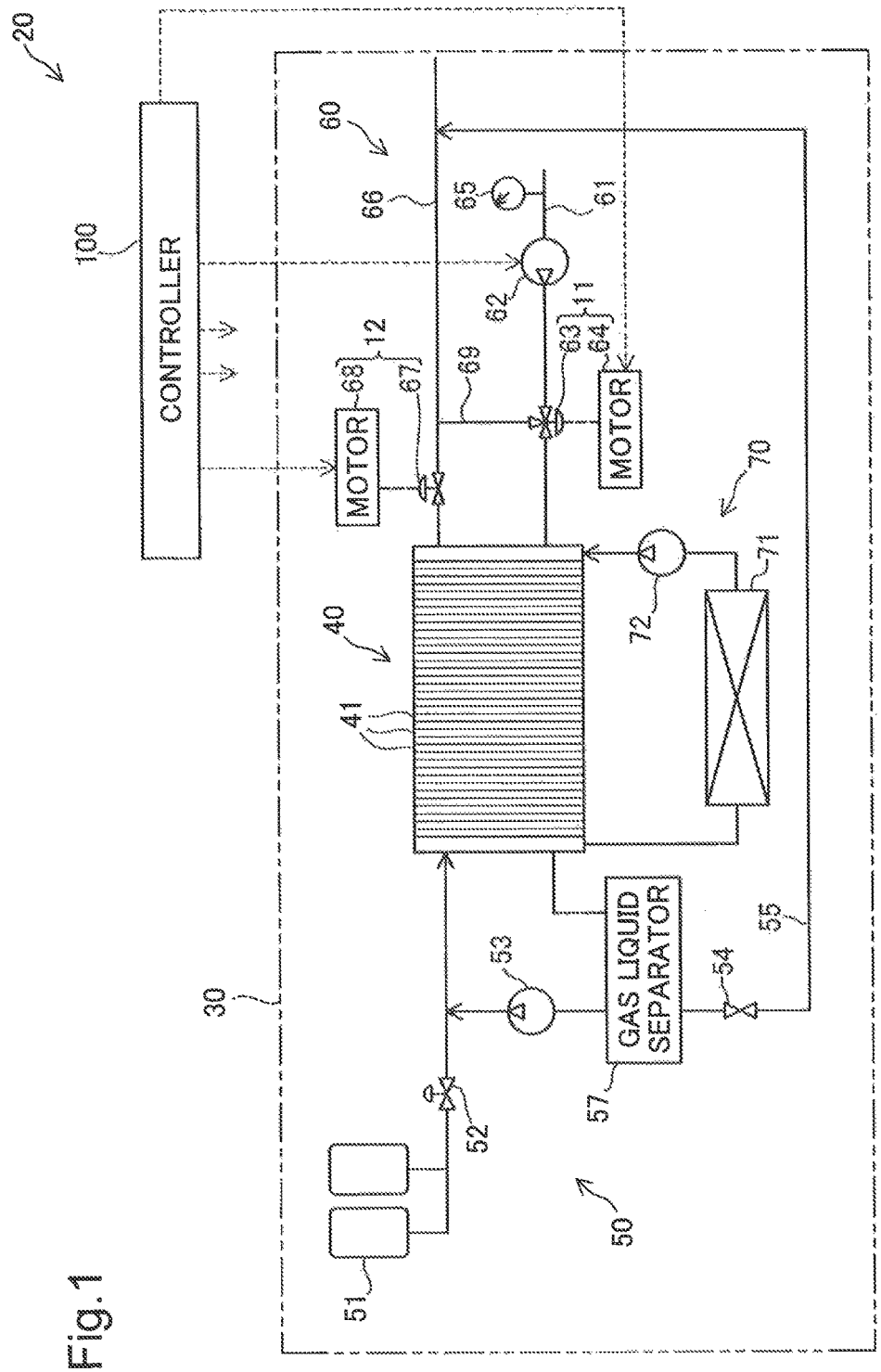
FIG. 1 is a block configuration diagram illustrating the schematic configuration of a fuel cell vehicle.

FIG. 1 is a block configuration diagram illustrating the schematic configuration of a fuel cell vehicle 20. The fuel cell vehicle 20 is a four-wheel vehicle and includes a fuel cell system 30 as shown in FIG. 1.

The fuel cell system 30 employs polymer electrolyte fuel cells to generate electric power by the reaction of hydrogen with oxygen. As shown in FIG. 1, the fuel cell system 30 includes a fuel cell stack 40, a hydrogen supply discharge mechanism 50, a cathode gas supply discharge mechanism 60, a cooling water circulation mechanism 70 and a controller 100.

The fuel cell stack 40 is provided by stacking a plurality of unit cells 41. Each unit cell 41 includes an anode, a cathode, an electrolyte membrane and separators. In the description hereof, the anodes of the plurality of unit cells 41 are collectively referred to as "anode", and the cathodes of the plurality of unit cells 41 are collectively referred to as "cathode".

The hydrogen supply discharge mechanism 50 is configured to supply and discharge hydrogen to and from the fuel cell stack 40 and includes a hydrogen tank 51, a regulator 52, a hydrogen circulation pump 53, a purge valve 54, a discharge passage 55 and a gas liquid separator 57.

The hydrogen tank 51 stores hydrogen. The regulator 52 supplies the hydrogen stored in the hydrogen tank 51 to the anode with regulating its pressure and supply volume. The gas liquid separator 57 serves to separate an exhaust from the anode into a gas and a liquid. The hydrogen circulation pump 53 resupplies the gas separated by the gas liquid separator 57 to the unit cells 41. The gas separated by the gas liquid separator 57 is mainly comprised of hydrogen that is not consumed and is discharged.

The discharge passage 55 is a pathway arranged to connect the gas liquid separator 57 with a cathode gas discharge flow path 66 provided in the cathode gas supply discharge mechanism 60 (described later). The purge valve 54 is provided on the discharge passage 55. The purge valve 54 is opened to discharge the liquid separated by the gas liquid separator 57.

The cathode gas supply discharge mechanism 60 is configured to supply and discharge a cathode gas to and from the fuel cell stack 40 and includes a cathode gas supply flow path 61, a first motor-operated valve 11, a second motor-operated valve 12, an air compressor 62, a flowmeter 65, a cathode gas discharge flow path 66 and a bypass 69. The first motor-operated valve 11 includes a flow dividing valve 63 and a flow dividing valve motor 64. The second motor operated valve 12 includes a pressure regulator 67 and a pressure regulator motor 68.

The cathode gas supply flow path 61 and the cathode gas discharge flow path 66 are provided as flow paths arranged to connect the fuel cell stack 40 with respective air openings thereof. An air cleaner is provided at the air opening of the cathode gas supply flow path 61.

The air compressor 62 is provided in the middle of the cathode gas supply flow path 61 to take in the air from the air opening of the cathode gas supply flow path 61 and compress the intake air. The air compressor 62 is placed at a position nearer to the air opening than a connecting point of the cathode gas supply flow path 61 and the bypass 69. The flowmeter 65 measures the flow rate of the cathode gas (the air) taken in by the air compressor 62.

The flow dividing valve 63 is provided in the cathode gas supply flow path 61 to be placed downstream of the air compressor 62 or in other words, between the air compressor 62 and the fuel cell stack 40. The flow dividing valve 63 divides the flow of the cathode gas flowing from the air compressor 62 into a downstream side of the cathode gas supply flow path 61 and the bypass 69. This flow dividing valve 63 is a three-way valve.

The flow dividing valve motor 64 is connected with the flow dividing valve 63 to generate a torque for regulating the opening of the flow dividing valve 63. The flow dividing valve motor 64 is a stepping motor.

The bypass 69 is a flow path arranged to connect the flow dividing valve 63 with the cathode gas discharge flow path 66. In this embodiment, "closing the flow dividing valve 63" means closing the flow path connecting the upstream with the downstream of the cathode gas supply flow path 61 and opening the flow path connecting the upstream of the cathode gas supply flow path 61 with the bypass 69. In response to input of a drive pulse for closing the flow dividing valve 63, a valve element of the flow dividing valve 63 is pressed against a valve seat of the flow dividing valve 63 with the stronger force than the simple contact force and is thereby sealed against the valve seat of the flow dividing valve 63.

The pressure regulator 67 is provided in the cathode gas discharge flow path 66. The pressure regulator 67 regulates the flow passage area of the cathode gas discharge flow path 66 according to its opening. In response to input of a drive pulse for closing the pressure regulator 67, a valve element of the pressure regulator 67 is pressed against a valve seat of the pressure regulator 67 with the stronger force than the simple contact force and is thereby sealed against the valve seat of the pressure regulator 67. The pressure regulator 67 includes a pilot valve (not shown). The pilot valve is a mechanism serving to reduce a pressure difference between the upstream and the downstream of the cathode gas discharge flow path 66 in the state that the opening of the cathode gas discharge flow path 66 is equal to zero.

The pressure regulator motor 68 is connected with the pressure regulator 67 to generate a torque for regulating the opening of the pressure regulator 67. The pressure regulator motor 68 is a stepping motor.

The cathode gas passing through the pressure regulator 67 flows through the connecting point with the bypass 69 and is released to the atmosphere from the air opening.

The cooling water circulation mechanism 70 is configured to cool down the fuel cell stack 40 and includes a radiator 71 and a cooling water circulation pump 72. The cooling water circulation mechanism 70 circulates cooling water between the unit cells 41 and the radiator 71, in order to control the operating temperature of the unit cells 41. Such circulation of cooling water leads to heat absorption in the unit cells 41 and heat release in the radiator 71.

The controller 100 is specifically an ECU (electronic control unit). The controller 100 outputs signals for controlling power generation by the fuel cell system 30, in response to a request for power generation. The controller 100 outputs signals to, for example, the air compressor 62, the flow dividing valve motor 64 and pressure regulator motor 68.

Figure 2:
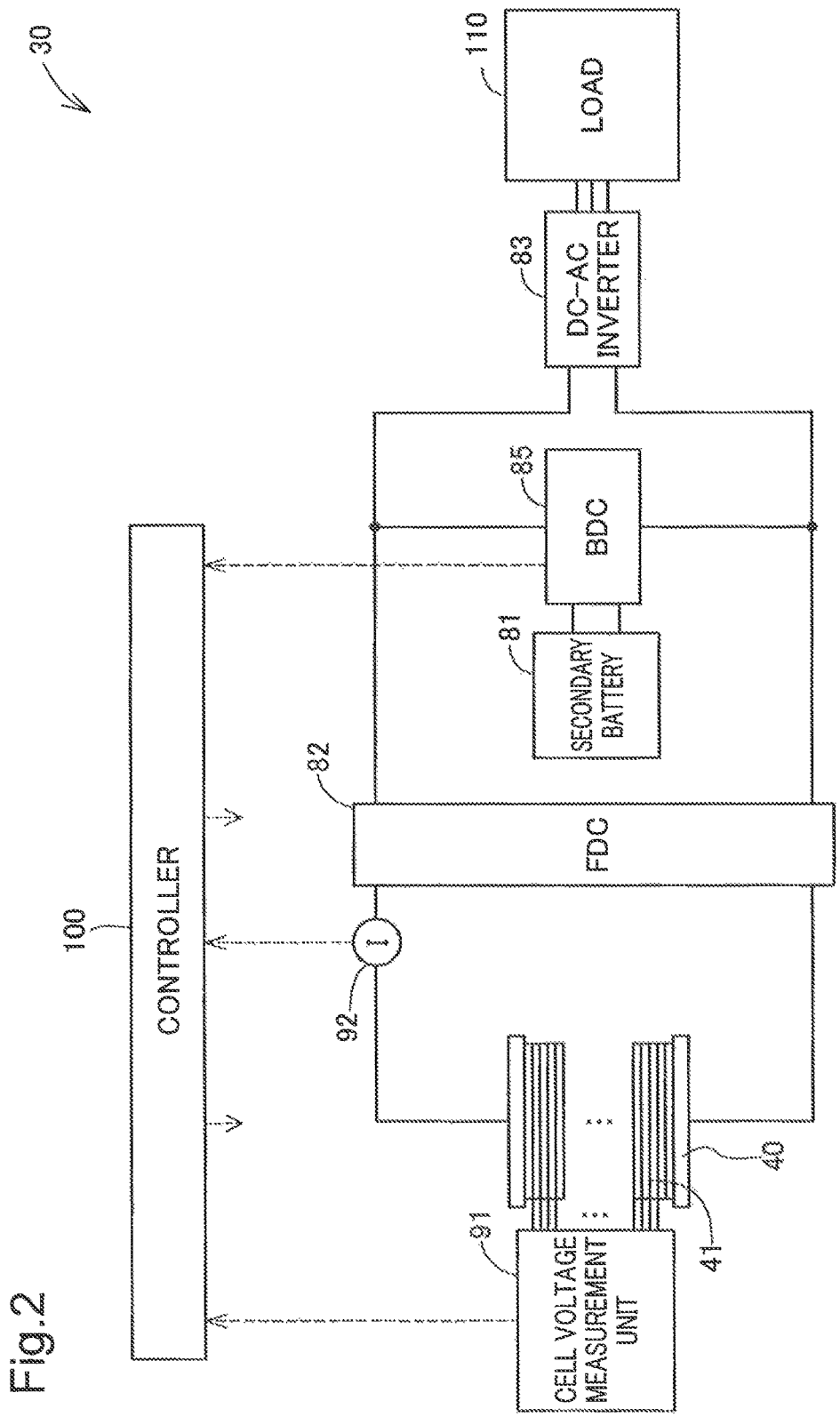
FIG. 2 is a schematic diagram illustrating the electrical configuration of a fuel cell system.

FIG. 2 is a schematic diagram illustrating the electrical configuration of the fuel cell system 30. The fuel cell system 30 includes a secondary battery 81, an FDC 82, a DC-AC inverter 83, a BDC 85, a cell voltage measurement unit 91 and a current measurement unit 92.

The cell voltage measurement unit 91 is connected with each of the unit cells 41 of the fuel cell stack 40 to measure the voltage of each unit cell 41 (cell voltage). The cell voltage measurement unit 91 sends the measurement results to the controller 100. The current measurement unit 92 measures the value of output current from the fuel cell stack 40 and sends the measured value to the controller 100.

The FDC 82 and the BDC 85 are circuits constituted as DC-DC converters. The FDC 82 controls the output current from the fuel cell stack 40, based on a current command value sent from the controller 100. The current command value denotes a target value of the output current from the fuel cell stack 40 and is determined by the controller 100. The FDC 82 also transforms an output voltage and supplies the transformed output voltage to the DC-AC inverter 83, while measuring the value of the output voltage and sending the measured value to the controller 100.

The BDC 85 controls charging and discharging of the secondary battery 81 under control by the controller 100. The BDC 85 measures the SOC (state of charge) of the secondary battery 81 and sends the measured SOC to the controller 100. The secondary battery 81 is constituted as a lithium ion battery and serves as an auxiliary power source.

The DC-AC inverter 83 is connected with the fuel cell stack 40 and a load 110. The DC-AC inverter 83 converts a DC power output from the fuel cell stack 40 or the secondary battery 81 into an AC power and supplies the AC power to the load 110.

The regenerative electric power generated by the load 110 is converted into a DC current by the DC-AC inverter 83 and is charged into the secondary battery 81 by the BDC 85. The controller 100 calculates an output command value by taking into account the SOC of the secondary battery 81 in addition to the load 110.

Figure 3:
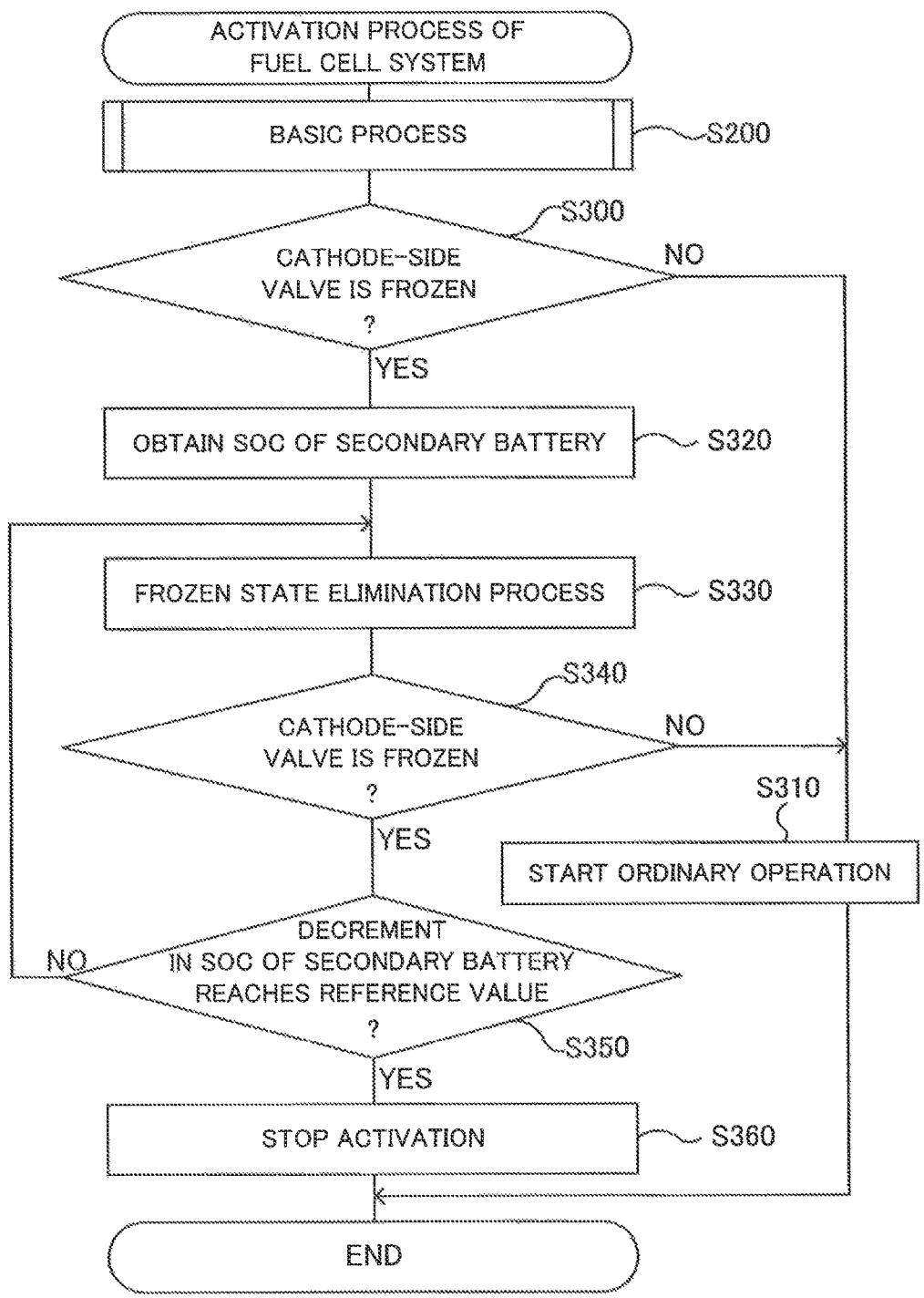
FIG. 3 is a flowchart showing an activation process of the fuel cell system.

FIG. 3 is a flowchart showing an activation process of the fuel cell system 30. This activation process is performed by the controller 100. The controller 100 starts this activation process to start the fuel cell system 30. The fuel cell system 30 is started, for example, when the driver presses a power switch (not shown) provided in the fuel cell vehicle 20 while depressing a brake pedal (not shown) in the state that the fuel cell vehicle 20 is parked.

Figure 4:
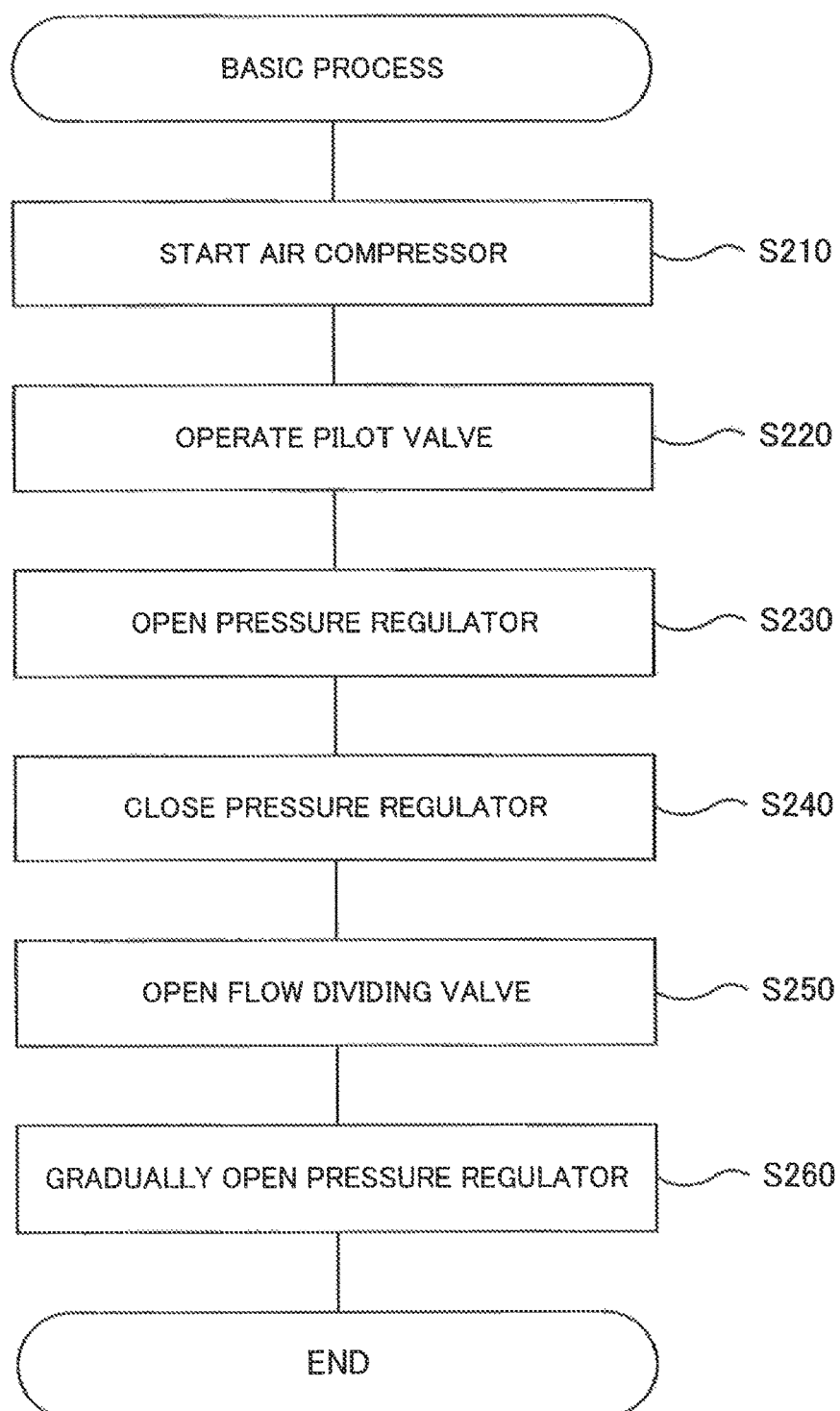
FIG. 4 is a flowchart showing a basic process.
Figure 5:
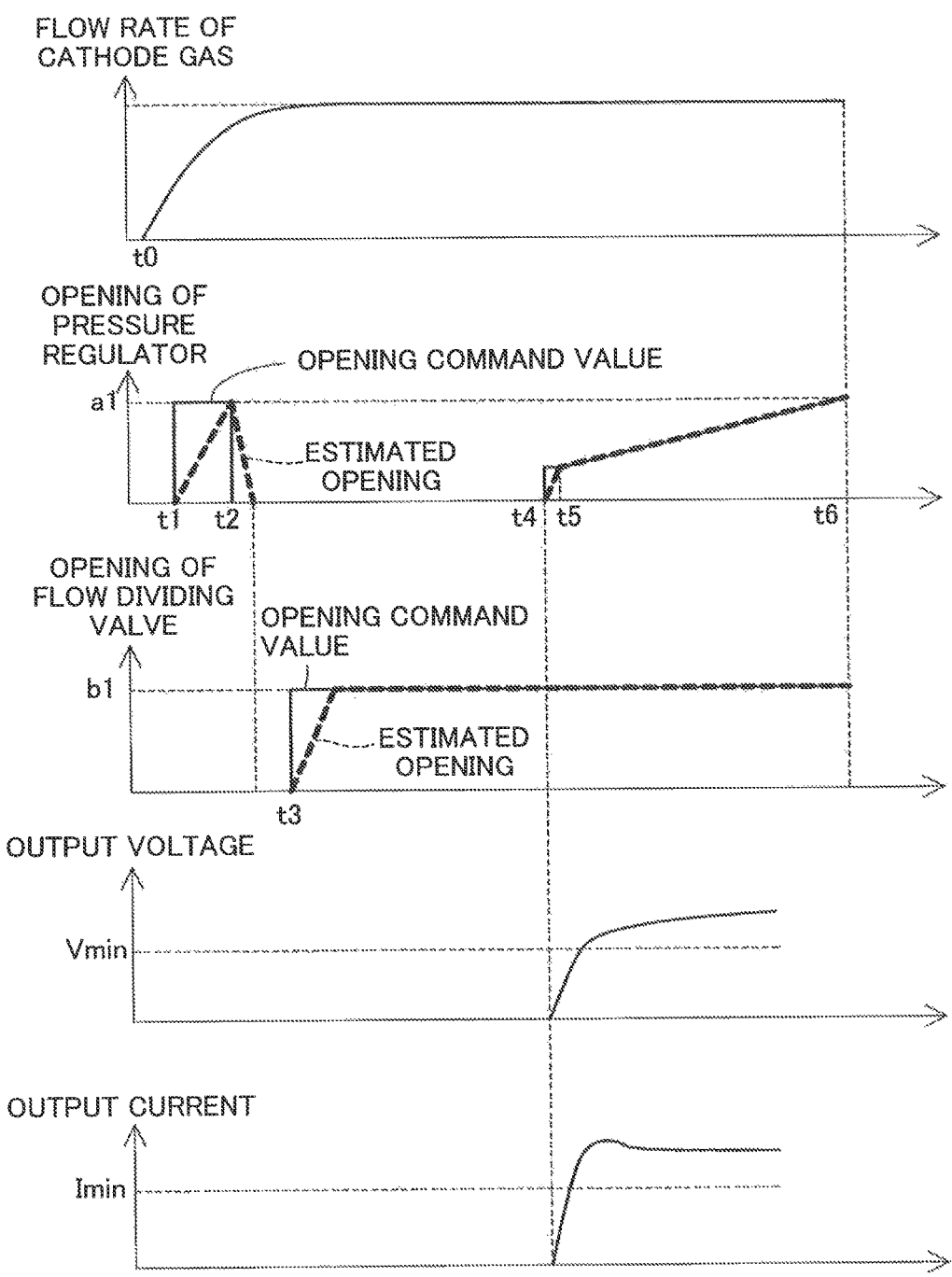
FIG. 5 is a timing chart showing time changes of respective parameters involved in the basic process.

The controller 100 first performs a basic process (S200). FIG. 4 is a flowchart showing the basic process. FIG. 5 is a timing chart showing time changes of respective parameters involved in the basic process. The basic process is described below with reference to FIGS. 4 and 5.

The controller 100 first starts the air compressor 62 (S210). In the illustrated example of FIG. 5, at time t0, this starts increasing the flow rate of the cathode gas measured by the flowmeter 65 to ensure the flow rate of or above a predetermined value. At this moment, the flow dividing valve 63 and the pressure regulator 67 are closed, so that the cathode gas flows through the bypass 69 and is discharged from the cathode gas discharge flow path 66 to the atmosphere.

The controller 100 subsequently operates the pilot valve of the pressure regulator 67 (S220). There is a possibility that a negative pressure is generated in the flow path blocked from the atmosphere by the flow dividing valve 63 and the pressure regulator 67 during parking. In the case where a negative pressure is generated, a large torque is required to open the pressure regulator 67. With a view to opening the pressure regulator 67 by the torque generated by the pressure generator motor 68, the pilot valve is operated to reduce the pressure difference between the upstream and the downstream of the pressure regulator 67.

The controller 100 then opens the pressure regulator 67 (S230). More specifically, the controller 100 inputs a drive pulse to the pressure regulator motor 68 to generate a torque in a direction of opening the pressure regulator 67. When receiving the torque from the pressure regulator motor 68, the pressure regulator 67 is opened in a non-frozen state but is not opened in a frozen state. The pressure regulator motor 68 loses steps when the pressure regulator 67 is not opened by input of the torque. In the description below, the pressure regulator 67 is assumed to be in the non-frozen state and to be opened and closed by input of the drive pulse, unless otherwise specified. The same applies to the flow dividing valve 63.

In the illustrated example of FIG. 5, an opening command value is kept at an opening a1 from time t1 until an estimated opening reaches the opening a1, and the estimated opening approaches the opening a1. The opening command value denotes a target value of the opening. The estimated opening denotes an opening estimated based on the input drive pulse. The pressure regulator motor 68 provided as the stepping motor does not have the position detecting mechanism, so that the opening of the pressure regulator 67 is obtained as an estimated value. The estimated opening is approximate to the actual opening in the case where the pressure regulator 67 is not frozen. The description regarding the opening command value and the estimated opening is also applied to the flow dividing valve 63 and the flow dividing valve motor 64.

Figure 6:
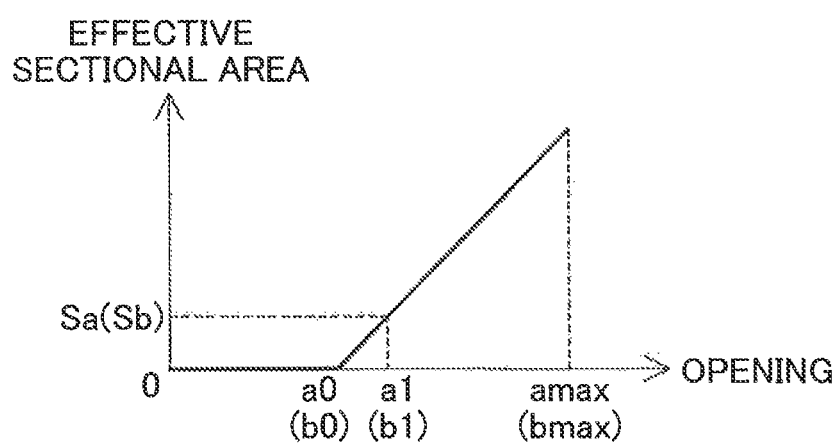
FIG. 6 is a graph schematically illustrating a relationship of an effective sectional area to an opening of a pressure regulator.

FIG. 6 is a graph schematically showing a relationship of the effective sectional area by the valve element and the valve seat of the pressure regulator 67 to the opening. Due to the seal structure by the valve element and the valve seat, the effective sectional area is kept zero even when the opening is slightly increased from zero, as shown in FIG. 6. An opening a0 denotes an opening at which the seal is released and the effective sectional area starts increasing. The opening a1 mentioned above is determined as an opening that is larger than the opening a0 and is smaller than an opening amax that is a maximum value of the opening. An area Sa denotes an effective sectional area at the opening a1 as shown in FIG. 6. The opening of zero is smaller than the opening a0. The controller 100 inputs a drive pulse for proving the opening a1 to the pressure regulator motor 68 at S230.

With regard to the flow dividing valve 63, an opening b0 denotes an opening at which the effective sectional area starts increasing; an opening bmax denotes a maximum value of the opening; an opening b1 (described later) denotes an opening determined to be larger than the opening b0 and smaller than the opening bmax; and an area Sb denotes an effective sectional area at the opening b1. This describes only the schematic relationship between the effective sectional area and the opening with regard to each of the flow dividing valve 63 and the pressure regulator 67. For example, according to this embodiment, the opening a0 and the opening b0 are different value, the opening a1 and the opening b1 are different values, and the area Sa and the area Sb are different values.

When the pressure regulator 67 is opened, the pressure at the cathode becomes close to the internal pressure of the cathode gas discharge flow path 66. This results in reducing the pressure difference between the upstream and the downstream of the flow dividing valve 63, so that a large torque is not required to open the flow dividing valve 63.

The controller 100 subsequently closes the pressure regulator 67 (S240). More specifically, the controller 100 inputs a drive pulse to the pressure regulator motor 68 to generate a torque in a direction of closing the pressure regulator 67. In the illustrated example of FIG. 5, the opening command value is set to zero after the estimated opening reaches the opening a1, and the estimated opening then converges to zero.

The controller 100 subsequently opens the flow dividing valve 63 (S250). In the illustrated example of FIG. 5, the opening command value is set to the opening b1 at time t3, and the estimated opening reaches the opening b1. As a result, the cathode gas flows into the cathode. The inflow of the cathode gas to the cathode dilutes hydrogen that is present at the cathode.

The controller 100 then gradually opens the pressure regulator 67 (S260). In the illustrated example of FIG. 5, the opening command value is set to a smaller value than the opening a1 at time t4 and is gradually increased after time t5. In the illustrated example of FIG. 5, the estimated opening increases with an increase of the opening command value.

After the time t4, hydrogen that is present at the cathode and is diluted with the cathode gas is gradually discharged from the cathode gas discharge flow path 66. As a result, the concentration of hydrogen in the gas discharged from the cathode gas discharge flow path 66 is decreased to or below a predetermined value (for example, 8%). This becomes ready for supplying the cathode gas required for power generation to the fuel cell stack 40.

After the time t4 at which the pressure regulator 67 is gradually opened, as shown in FIG. 3, the controller 100 determines whether the cathode-side valve is frozen (S300). The state that "the cathode-side valve is frozen" means the state that at least one of the flow dividing valve 63 and the pressure regulator 67 is frozen. The flow-dividing valve 63 in the frozen state cannot be opened by the torque generated by the flow dividing valve motor 64 in the basic process. Similarly the pressure regulator 67 in the frozen state cannot be opened by the torque generated by the pressure regulator motor 68 in the basic process.

According to this embodiment, the controller 100 performs the determination with regard to the frozen state at S300, based on the values of the output current and the output voltage. More specifically, the controller 100 determines whether both the output current and the output voltage meet values that allow for a normal start of power generation by the fuel cell system 30. Furthermore specifically, the controller 100 determines that the cathode-side valve is frozen, when at least one of the conditions that the output current is greater than a lower limit current value Imin that denotes a current value obtained during power generation with the remaining oxygen at the cathode and that the output voltage is larger than a predetermined lower limit voltage value Vmin is not satisfied. The reason of such determination is that the cathode-side valve in the frozen state is more likely to fail the basic process (S200) and fail a normal start of power generation.

For example, when the flow dividing valve 63 is frozen as the cathode-side valve in the frozen state, the reason of a failure in the basic process is that the flow dividing valve 63 cannot be opened at S250.

When the pressure regulator 67 is frozen, on the other hand, the reason of a failure in the basic process is that the pressure regulator 67 cannot be opened at S230 and the flow dividing valve 63 even in the non-frozen state cannot be thereby opened at S250. In the case when the pressure regulator 67 is frozen, the flow dividing valve 63 even in the non-frozen state cannot be opened. This is because at a low temperature environment such as to freeze the pressure regulator 67, there is a high possibility that a negative pressure is generated in the flow path blocked from the atmosphere by the flow dividing valve 63 and the pressure regulator 67. As described above, it is difficult to pen the flow dividing valve 63 by the torque generated by the flow dividing valve motor 64 unless the negative pressure is released by utilizing the pressure regulator 67.

In summary, in the case where the flow dividing valve 63 is frozen and the pressure regulator 67 is not frozen, the flow dividing valve 63 cannot be opened, but the pressure regulator 67 can be opened. In the case where the flow dividing valve 63 is not frozen and the pressure regulator 67 is frozen, on the other hand, neither the flow dividing valve 63 nor the pressure regulator 67 can be opened. In the case where both the flow dividing valve 63 and the pressure regulator 67 are frozen, neither the flow dividing valve 63 nor the pressure regulator 67 can be opened.

When the cathode-side valve is not frozen (S300: NO), the controller 100 starts ordinary operation (S310) and terminates the activation process. The ordinary operation herein means power generation in response to a required power. In other words, when it is determined that the cathode-side valve is not frozen, the controller 100 starts power generation by the fuel cell system 30.

In the illustrated example of FIG. 5, after time t4, the output voltage exceeds the lower limit voltage valve Vmin and the output current exceeds the lower limit current value Imin, so that it is determined that the cathode-side valve is not frozen. In the case of starting the ordinary operation, the opening of the flow dividing valve 63 is set to a full open position.

When the cathode-side valve is frozen (S300: YES), on the other hand, the controller 100 obtains the SOC of the secondary battery 81 (S320). The obtained SOC is used for the processing of S350 described later. The controller 100 subsequently performs a frozen state elimination process (S330).

Figure 7:
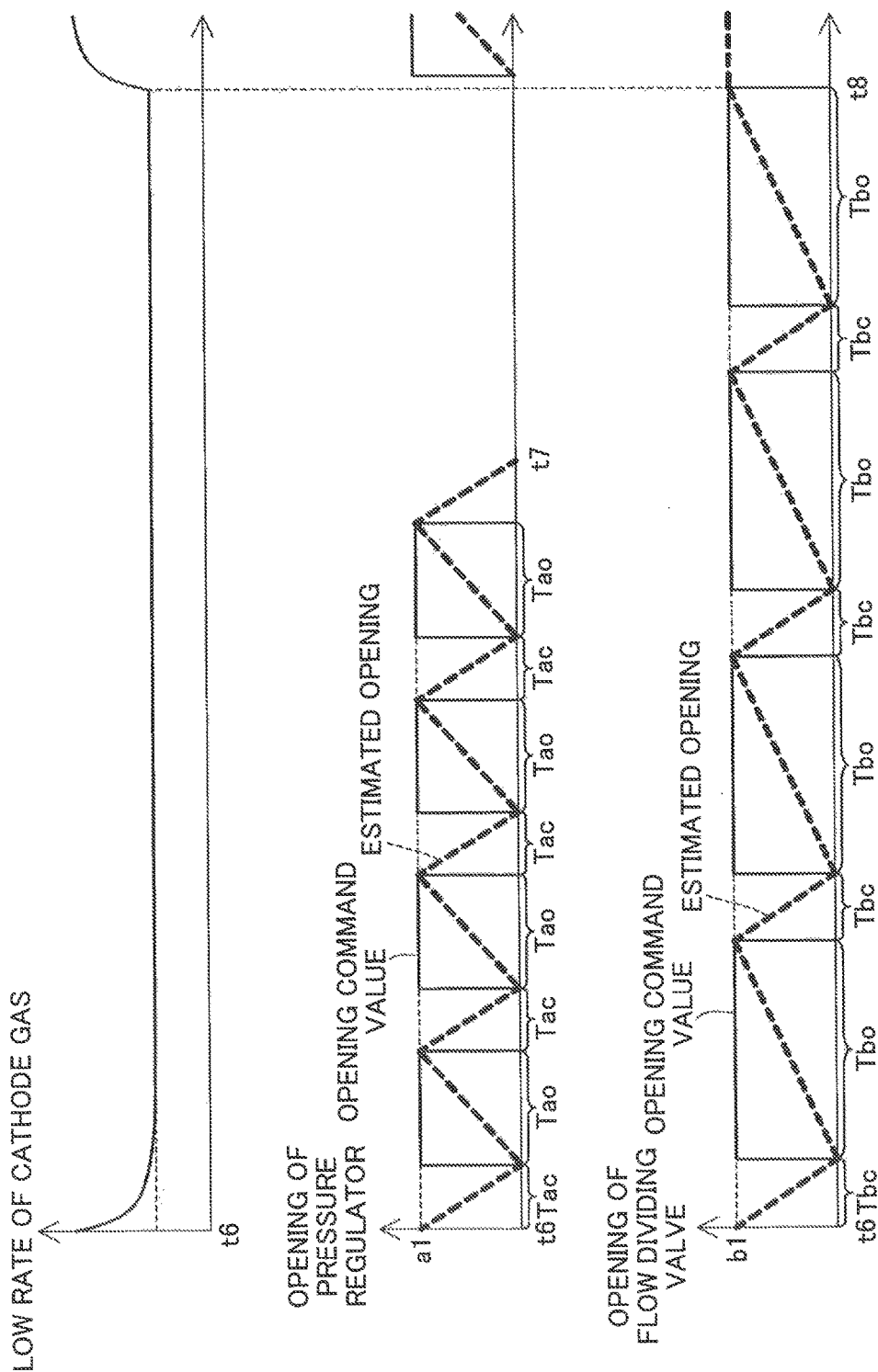
FIG. 7 is a timing chart during a frozen state elimination process.

FIG. 7 is a timing chart during the frozen state elimination process. The frozen state elimination process starts at time t6 when the estimated opening of the flow dividing valve 63 reaches the opening a1.

When the frozen state elimination process is started, the air compressor 62 continues compression of the cathode gas, while the flow rate of the cathode gas is decreased as shown in FIG. 7.

The opening command value of the flow dividing valve 63 is set such that the estimated opening repeats decreasing and increasing. The maximum value of the estimated opening is the opening a1, and the minimum value of the estimated opening is zero. A time period Tac denotes a time duration when the estimated opening is decreasing in one cycle of increasing and decreasing the estimated opening. The opening command value is kept zero in this time period Tac. A time period Tao denotes a time duration when the estimated opening is increasing in one cycle. The opening command value is kept at the opening a1 in this time period Tao. One cycle of increasing and decreasing the estimated opening accordingly equal to a time period (Tac+Tao). The time period Tao is longer than the time period Tac. Accordingly, the decreasing estimated opening has a larger absolute value in rate of change of the estimated opening than the increasing estimated opening.

Similarly the opening command value of the pressure regulator 67 during the frozen state elimination process is set such that the estimated opening repeats decreasing and increasing. The maximum value of the estimated opening is the opening b1, and the minimum value of the estimated opening is zero. A time period Tbc denotes a time duration when the estimated opening is decreasing in one cycle. The opening command value is kept zero in this time period Tbc. A time period Tbo denotes a time duration when the estimated opening is increasing in one cycle. The opening command value is kept at the opening b1 in this time period Tbo. One cycle of increasing and decreasing the estimated opening is accordingly equal to a time period (Tbc+Tbo). The time period Tbo is longer than the time period Tbc. Accordingly, the decreasing estimated opening has a larger absolute value in rate of change of the estimated opening than the increasing estimated opening.

Figure 8:
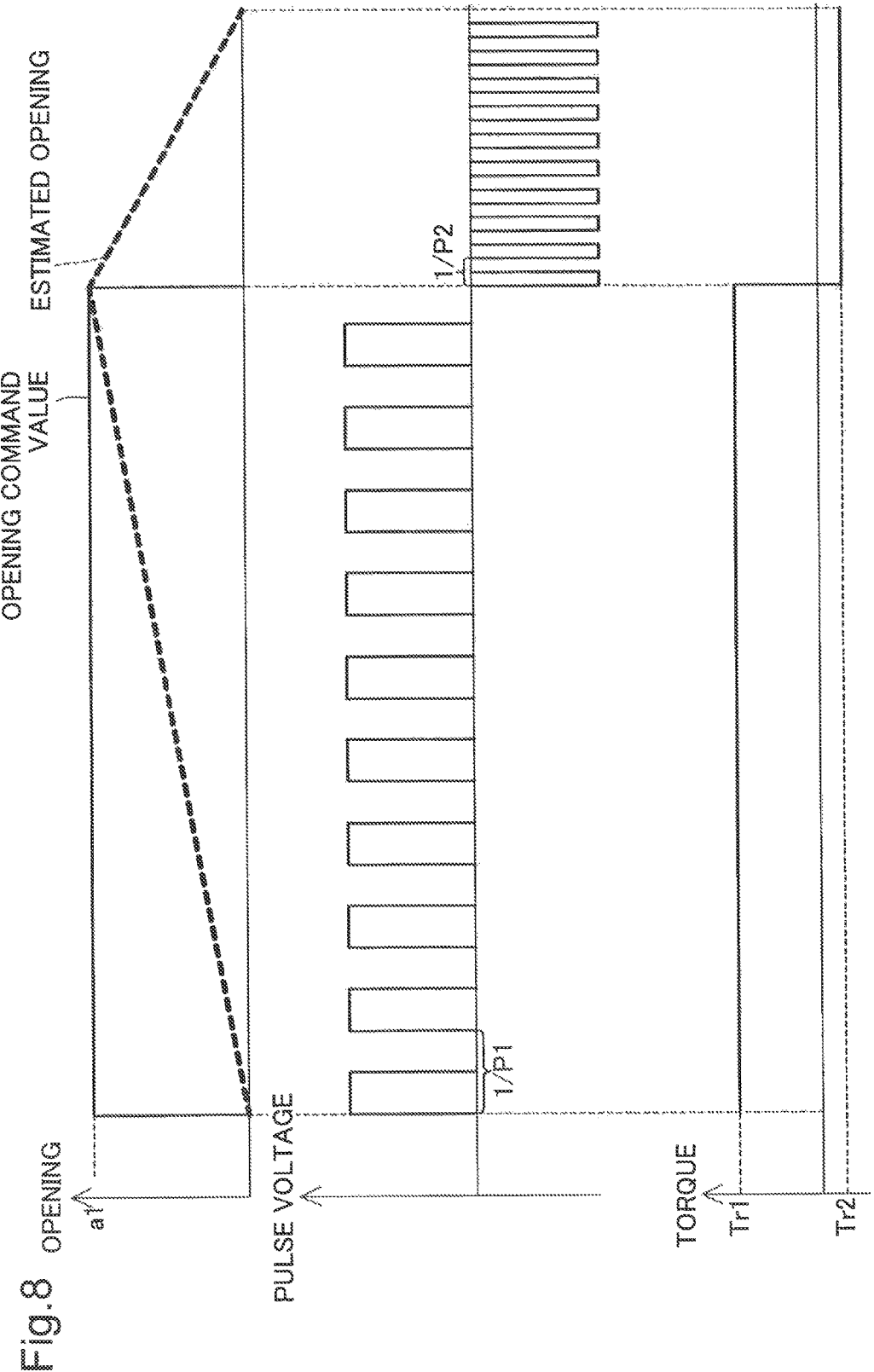
FIG. 8 is a timing chart showing a relationship of an opening command value and an estimated opening to a pulse voltage and a torque.

FIG. 8 is a timing chart showing a relationship of the opening command value and the estimated opening to the pulse voltage (voltage of the drive pulse) and the torque generated by the pressure regulator motor 68, with regard to the pressure regulator 67.

According to this embodiment, the drive pulse for increasing the opening is provided as a positive value, and the drive pulse for decreasing the opening is provided as a negative value. Hereinafter, the drive pulse for increasing the opening in the frozen state elimination process is called first drive pulse, and the drive pulse for decreasing the opening in the frozen state elimination process is called second drive pulse. According to this embodiment, the torque in the direction of increasing the opening is provided as a positive value, and the torque in the direction of decreasing the opening is provided as a negative value. FIG. 8 shows variations in one cycle of increasing and decreasing the estimated opening.

The following description is also applicable to the flow dividing valve 63. The pulse speed of the first drive pulse input into the flow dividing valve motor 64 and the pulse speed of the first drive pulse input into the pressure regulator motor 68 are, however, not necessarily equal to each other and are different values according to the embodiment. Similarly the pulse speed of the second drive pulse input into the flow dividing valve motor 64 and the pulse speed of the second drive pulse input into the pressure regulator motor 68 are not necessarily equal to each other and are different values according to the embodiment.

The pulse speed of the first drive pulse is a pulse speed P1 (pulse per second), and the pulse period of the first drive pulse is (1/P1) seconds as shown in FIG. 8. The pulse speed of the second drive pulse is a pulse speed P2, and the pulse period of the second drive pulse is (1/P2) seconds as shown in FIG. 8. As understood from FIG. 8, (1/P1) seconds is longer than (1/P2) seconds. In other words, the pulse speed P2 is higher than the pulse speed P1. The pulse speed P2 is set to a smaller value than a pulse speed that causes a bounce-back.

The torque shown in FIG. 8 is a value determined by applying the pulse speed to the characteristic of the stepping motor with taking no account of little time changes. In general, the stepping motor generates the smaller torque at the higher pulse speed. Accordingly, the absolute value of a valve-opening torque Tr1 that is the torque in the direction of increasing the opening is larger than the absolute value of a valve-closing torque Tr2 that is the torque in the direction of decreasing the opening.

Figure 9:
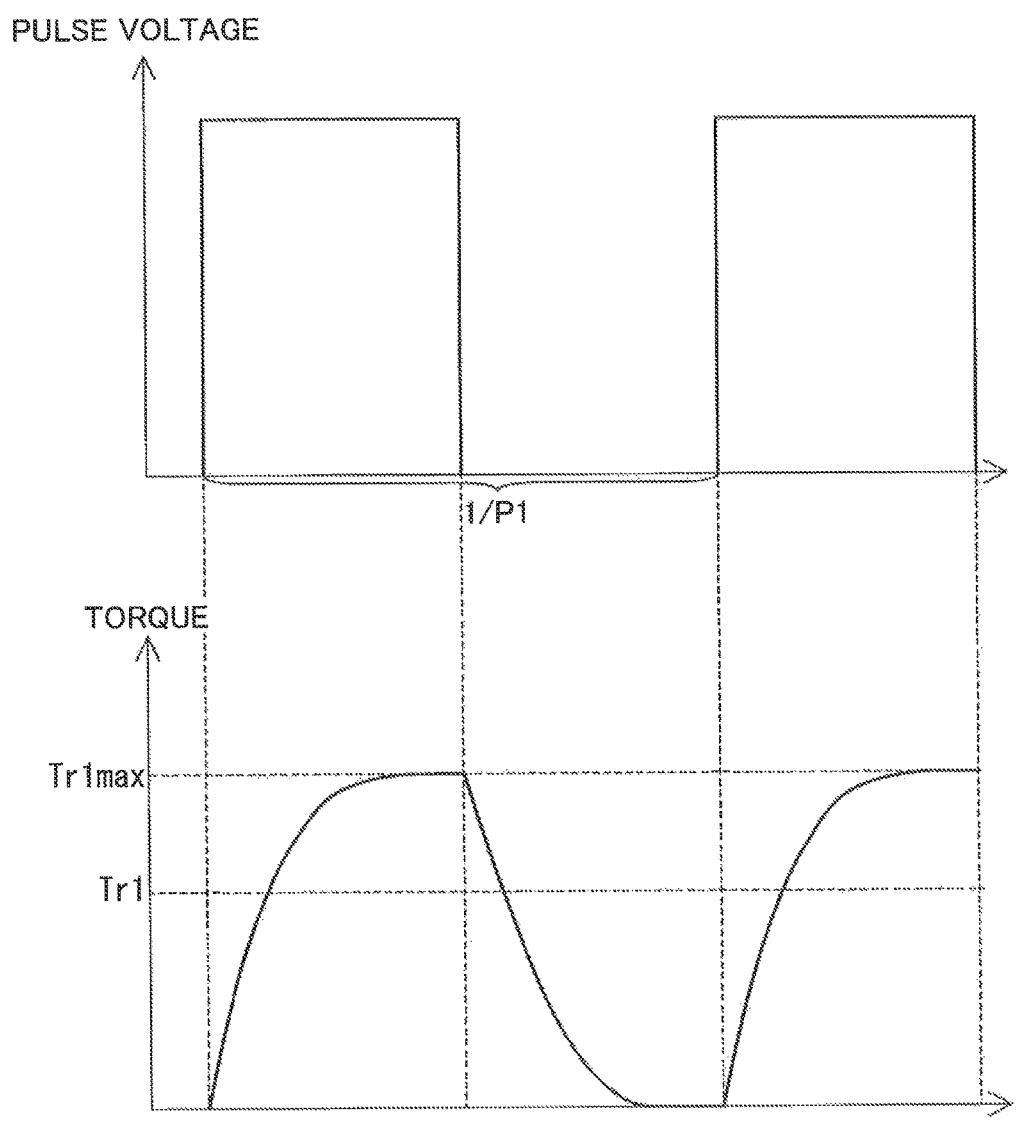
FIG. 9 is a timing chart showing a relationship of a first drive pulse to a torque.

FIG. 9 is a timing chart showing a relationship of the pulse voltage of the first drive pulse to the torque generated by the pressure regulator motor 68. Unlike FIG. 8, FIG. 9 shows a torque variation accompanied with a change of the pulse voltage. The following description is also applicable to the flow dividing valve motor 64.

As shown in FIG. 9, the absolute value of the torque starts increasing at a start of input of the pulse voltage and converges to a valve-opening maximum torque Tr1max. As shown in FIG. 9, the absolute value of the torque starts decreasing at an end of input of the pulse voltage and eventually becomes equal to zero. The valve-opening torque Tr1 is an approximate average value of this torque variation and has the smaller absolute value than that of the valve-opening maximum torque Tr1max.

Figure 10:
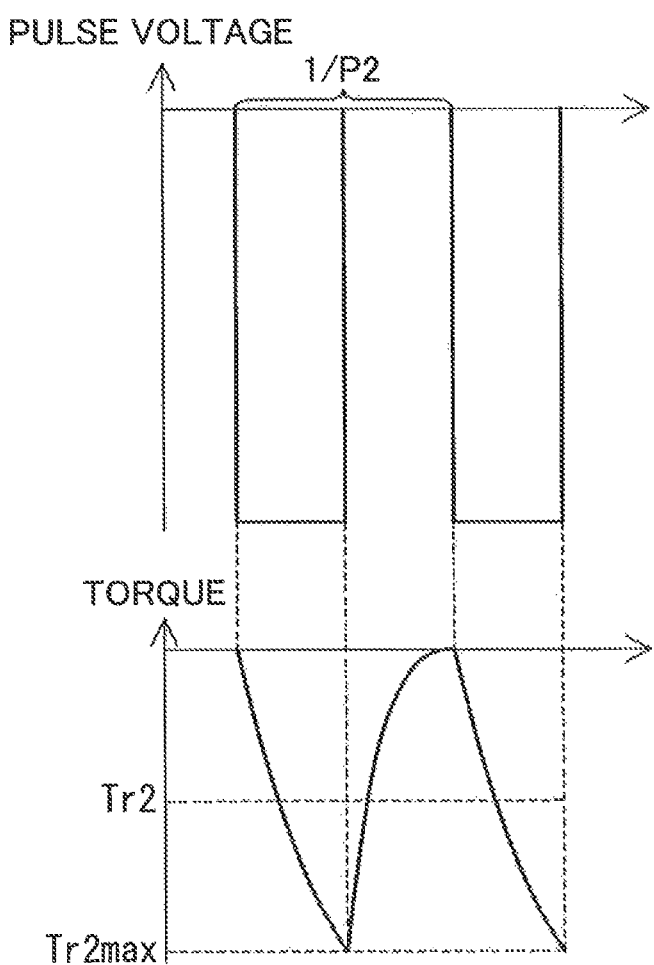
FIG. 10 is a timing chart showing a relationship of a second drive pulse to a torque.

FIG. 10 is a timing chart showing a relationship of the pulse voltage of the second drive pulse to the torque generated by the pressure regulator motor 68. As shown in FIG. 10, the absolute value of the torque starts increasing at, a start of input of the pulse voltage. The absolute value of the torque, however, starts decreasing before converging. This is because input of the pulse voltage is ended while the absolute value of the torque is increasing. The absolute value of the torque eventually becomes equal to zero after the end of input of the pulse voltage.

The torque generated by input of the second drive pulse to provide a maximum absolute value is called a valve-closing maximum torque Tr2max. The valve-closing torque Tr2 is an approximate average value of this torque variation and has the smaller absolute value than that of the valve-closing maximum torque Tr2max. The absolute value of the maximum valve-opening torque Tr1max is larger than the absolute value of the maximum valve-closing torque Tr2max.

In response to generation of the torque described above with reference to FIGS. 9 and 10, in the state that the pressure regulator 67 is not frozen, the opening of the pressure regulator 67 is changed with a change in number of input pulses. This makes the estimated opening closer to the actual opening. In the state that the pressure regulator 67 is frozen, on the other hand, the estimated opening differs from the actual opening, so that the pressure regulator motor 68 loses steps. Accompanied with the step-out of the pressure regulator motor 68, a vibration due to the torque variation is applied to the frozen location.

With regard to the pressure regulator 67, the frozen state elimination process of this embodiment sets the opening command value to the opening a1 four times and subsequently sets the opening command value to zero before being terminated as shown in FIG. 7. The estimated opening then becomes zero at time t7 as shown in FIG. 7. With regard to the flow dividing valve 63, the frozen state elimination process sets the opening command value to the opening b1 four times before being terminated. The forth setting of the opening command value to the opening b1 is terminated at time t8 that is later than the time t7 as shown in FIG. 7. After that, the opening command value is kept at the opening b1.

When the frozen state is eliminated by the frozen state elimination process, the flow dividing valve 63 is opened and closed, while the pressure regulator 67 is kept closed, from the time t7 to the time t8. This causes the cathode gas to flow into the cathode and dilutes hydrogen that is present at the cathode.

On completion of one cycle of the frozen state elimination process, the controller 100 determines whether the cathode-side valve is frozen (S340). The processing of S340 is similar to the processing of S300. The controller 100 increases the flow rate of the cathode gas, subsequently opens the pressure regulator 67 and performs the determination based on the current value and the voltage value as shown by the changes after the time t8 in FIG. 7. When the cathode-side valve is not frozen (S340: NO), the controller 100 proceeds to the processing of S310 described above.

When the cathode-side valve is frozen (S340: YES), on the other hand, the controller 100 determines whether a decrement in SOC of the secondary battery 81 reaches a reference value (for example, 5%) (S350). When the decrement in SOC of the secondary battery 81 does not reach the reference value (S350: NO), the controller 100 performs the processing of S330 again.

When the decrement in SOC of the secondary battery 81 reaches the reference value (S350: YES), on the other hand, the controller 100 stops activation of the fuel cell system 30 (S360) and terminates the activation process.

Figure 11:
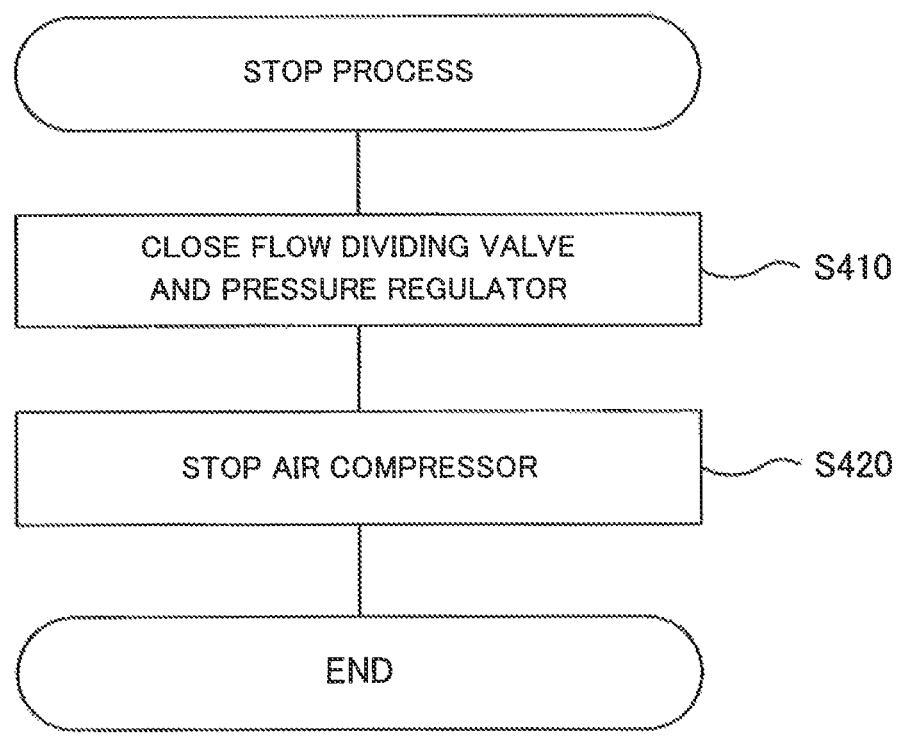
FIG. 11 is a flowchart showing a stop process.

FIG. 11 is a flowchart showing a stop process of the fuel cell system 30. This stop process is performed by the controller 100. The controller 100 starts this stop process to stop the fuel cell system 30. The fuel cell system 30 is stopped, for example, when the driver presses the power switch to stop driving and park the fuel cell vehicle 20.

The controller 100 first closes the flow dividing valve 63 and the pressure regulator 67 (S410). More specifically, the processing of S410 respectively inputs drive pulses having the opening command values set to zero into the flow dividing valve motor 64 and the pressure regulator motor 68. The controller 100 subsequently stops the air compressor 62 (S420) and terminates this stop process. This results in stopping the fuel cell system 30 in the state that the first motor-operated valve 11 is operated to connect the bypass 69 with the cathode gas supply flow path 61.

The configuration of this embodiment provides at least the following advantageous effects.

In the state that at least one of the flow dividing valve 63 and the pressure regulator 67 is frozen, the frozen state is tried to be eliminated by the valve-opening and valve-closing operations by the flow dividing valve motor 64 and the pressure regulator motor 68 provided as the stepping motors. These valve-opening and valve-closing operations are characterized by the first drive pulse and the second drive pulse. Using both the torque in the direction of increasing the opening and the torque in the direction of decreasing the opening increases the likelihood that the frozen state is eliminated.

In the state that only one of the flow dividing valve 63 and the pressure regulator 67 is frozen as well as in the state that both the flow dividing valve 63 and the pressure regulator 67 are frozen, the valve-opening and valve-closing operations in the frozen state elimination process with respect to both the flow dividing valve 63 and the pressure regulator 67 eliminates the need for determination of which of the flow dividing valve 63 and the pressure regulator 67 is frozen. This accordingly allows for the determination of the frozen state based on the voltage value and the current value.

The second drive pulse is set to the pulse speed that does not cause a bounce-back even when the second drive pulse is input into the valve in the non-frozen state. This does not cause any problem by the absence of the position detecting mechanism of the stepping motor.

The first drive pulse provides the opening command value corresponding to the are Sa or the area Sb (>0) that is the effective sectional area. Using the torque in the direction of increasing the opening is expected to eliminate the frozen state to such a degree that keeps the passage.

The second drive pulse causes a torque variation at the high frequency, so that a vibration at the high frequency is applied to the frozen location. This is expected to eliminate the frozen state.

The second drive pulse provides the opening command value corresponding to the opening of zero. This causes the valve element to abut on the valve seat and is thus expected to eliminate the frozen state.

The first drive pulse provide the opening command value corresponding to the area Sa or the area Sb that is the effective sectional area, while compression of the air by the air compressor 62 continues during the frozen state elimination process. The cathode gas is accordingly supplied to the cathode at the time when the frozen state is eliminated. This allows for power generation and also dilutes hydrogen that is present at the cathode at the time when the frozen state is eliminated.

The configuration of the embodiment stops the frozen state elimination process and stops activation of the fuel cell system 30, before the SOC of the secondary battery 81 is excessively decreased. This saves the electric power for a next start of the fuel cell system 30.

The invention is not limited to any of the embodiments, the examples and the modifications described above but may be implemented by a diversity of other configurations without departing from the scope of the invention. For example, the technical features of any of the embodiments, the examples and modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein. Some examples are given below.

Determining whether the frozen state of the cathode-side valve is eliminated may be based on the temperature of the fuel cell. For example, it may be determined that the frozen state is eliminated and power generation is started, when the temperature of the fuel cell increases by a predetermined value or more.

The frozen state or non-frozen state may be determined separately for the flow dividing valve and the pressure regulator. In this case, the first drive pulse and the second drive pulse may be input only the valve that is in the frozen state.

In the case where the frozen state or the non-frozen state is determined separately for the flow dividing valve and the pressure regulator, for example, the occurrence of the frozen state may be determined when the stepping motor loses steps. In another example, the temperatures of the flow dividing valve and the pressure regulator may be measured, and the occurrence of the frozen state may be determined when the measured temperature is equal to or lower than a predetermined temperature (for example, 0° C.).

The step-out of the stepping motor may be detected, for example, by providing the flow dividing valve motor or the pressure regulator motor with a position detecting mechanism.

The first drive pulse input into the flow dividing valve motor and the first drive pulse input into the pressure regulator motor may have identical pulse speeds.

The second drive pulse input into the flow dividing valve motor and the second drive pulse input into the pressure regulator motor may have identical pulse speeds.

The first drive pulse may correspond to the opening command value of the full open position.

The second drive pulse may correspond to the opening command value that is larger than zero.

The compressor may not be necessarily driven during the frozen state elimination process.

A pressure regulator (hereinafter referred to as alternative pressure regulator) may be used in place of the flow dividing valve.

In a configuration using the alternative pressure regulator, the bypass may be connected with upstream of the alternative pressure regulator or may be omitted.

In a configuration that omits the bypass, a safety valve that is operated at a high pressure may be provided in the air compressor or in the cathode gas supply flow path in case the alternative pressure regulator is frozen.

The frozen state elimination process may be performed until the SOC of the secondary battery reaches a lower limit value of the effective use range.

The secondary battery may be nickel metal hydride battery.

The fuel cell system may not be necessarily mounted on the four-wheel vehicle but may be mounted on any other suitable transport equipment (for example, two-wheel vehicle or train). The fuel cell system may be stationary.

The invention claimed is:

1. A fuel cell system, comprising:
    a compressor that is placed in a supply flow path arranged to supply a cathode gas to a fuel cell;
    a first motor-operated valve that is placed between the fuel cell and the compressor in the supply flow path;
    a first stepping motor that is provided in the first motor-operated valve;
    a second motor-operated valve that is placed in a discharge flow path arranged to discharge the cathode gas from the fuel cell;
    a second stepping motor that is provided in the second motor-operated valve; and
    a controller that is configured to control power generation by the fuel cell and to input drive pulses into the first stepping motor and the second stepping motor, so as to open the first motor-operated valve and the second motor-operated valve at a start of the fuel cell and close the first motor-operated valve and the second motor-operated valve at a stop of the fuel cell, wherein
    the first stepping motor is driven by input of the drive pulse to generate a torque to open and close the first motor-operated valve, and
    the second stepping motor is driven by input of the drive pulse to generate a torque to open and close the second motor-operated valve, wherein
    the controller is configured to determine whether at least one of the first motor-operated valve and the second motor-operated valve is in a frozen state at the start of the fuel cell, and
        when it is determined that neither the first motor-operated valve nor the second motor-operated valve is in the frozen state, the controller starts power generation by the fuel cell, and
        when it is determined that at least one of the first motor-operated valve and the second motor-operated valve is in the frozen state, the controller is configured to perform a predetermined process of alternately inputting a first drive pulse to at least one of the first stepping motor and the second stepping motor, the first drive pulse generating a torque in a direction of increasing a valve opening, and the second drive pulse having a higher pulse speed than a pulse speed of the first drive pulse and generating a torque in a direction of decreasing the valve opening.

2. The fuel cell system according to claim 1, wherein when it is determined that at least one of the first motor-operated valve and the second motor-operated valve is in the frozen state, the controller is configured to perform the predetermined process with respect to both the first stepping motor and the second stepping motor.

3. The fuel cell system according to claim 2, wherein the first drive pulse is a pulse that provides a larger valve opening than a valve opening corresponding to an effective sectional area of zero between a valve seat and a valve element in the first motor-operated valve or in the second motor-operated valve.

4. The fuel cell system according to claim 2, wherein the second drive pulse is a pulse that provides a smaller valve opening than a valve opening corresponding to an effective sectional area of zero between a valve seat and a valve element in the first motor-operated valve or in the second motor-operated valve.

5. The fuel cell system according to claim 1, wherein the controller is configured to drive the compressor to decrease a concentration of hydrogen in a gas discharged from the discharge flow path to or below a predetermined value.

6. The fuel cell system according to claim 1, wherein the first motor-operated valve comprises a mechanism configured as a flow dividing valve, the fuel cell system further comprising:
a bypass that is arranged to connect the first motor-operated valve with the discharge flow path, wherein the discharge flow path is connected with the bypass at a position downstream of the second motor-operated valve,
the fuel cell system being stopped in a state that the first motor-operated valve makes the supply flow path communicate with the bypass.

7. The fuel cell system according to claim 1, further comprising:
a secondary battery that is configured to accumulate electric power generated by the fuel cell and supply the accumulated electric power to the controller to perform the predetermined process, wherein
the controller is configured to stop the predetermined process when a state of charge of the secondary battery becomes lower than a reference value.

8. The fuel cell system according to claim 1, wherein the controller is configured to drive the compressor, input a drive pulse for opening the first motor-operated valve to the first stepping motor, and input a drive pulse for opening the second motor-operated valve to the second stepping motor at the start of fuel cell, in order to determine whether at least one of the first motor-operated valve and the second motor-operated valve is in the frozen state, based on whether power generation by the fuel cell is normally started or not.

9. The fuel cell system according to claim 1, wherein the first drive pulse input into the first stepping motor and the first drive pulse input into the second stepping motor have different pulse speeds, and
the second drive pulse input into the first stepping motor and the second drive pulse input into the second stepping motor have different pulse speeds.

* * * * *